(12) United States Patent
Yamada (10) Patent No.: US 9,739,380 B2
(45) Date of Patent: Aug. 22, 2017

(54) BUTTERFLY PRESSURE CONTROL VALVE

(71) Applicant: Kitz SCT Corporation, Tokyo (JP)

(72) Inventor: Yasuhito Yamada, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 167 days.

(21) Appl. No.: 14/648,267

(22) PCT Filed: Nov. 7, 2013

(86) PCT No.: PCT/JP2013/080115
§ 371 (c)(1),
(2) Date: May 29, 2015

(87) PCT Pub. No.: WO2014/087789
PCT Pub. Date: Jun. 12, 2014

(65) Prior Publication Data
US 2015/0292627 A1    Oct. 15, 2015

(30) Foreign Application Priority Data

Dec. 4, 2012   (JP) .................................. 2012-264994

(51) Int. Cl.
*F16K 1/22* (2006.01)
*F16K 31/54* (2006.01)
(Continued)

(52) U.S. Cl.
CPC .............. *F16K 1/226* (2013.01); *F16K 1/221* (2013.01); *F16K 1/228* (2013.01); *F16K 31/524* (2013.01); *F16K 31/54* (2013.01); *F16K 51/02* (2013.01)

(58) Field of Classification Search
CPC .......... F16K 1/226; F16K 31/54; F16K 1/221; F16K 1/228; F16K 51/02; F16K 31/524
(Continued)

(56) References Cited

U.S. PATENT DOCUMENTS 2,934,309 A * 4/1960 Morser ................. F16K 1/2285
                                                        251/159
3,904,171 A * 9/1975 Chronister ................ F16K 5/14
                                                        251/159

FOREIGN PATENT DOCUMENTS

JP          49-33215         3/1974
JP          54-121344        8/1979
(Continued)

OTHER PUBLICATIONS

International Search Report issued Dec. 17, 2013 in International Application No. PCT/JP2013/080115.

*Primary Examiner* — Marina Tietjen
(74) *Attorney, Agent, or Firm* — Wenderoth, Lind & Ponack, L.L.P.

(57) ABSTRACT

A butterfly pressure control valve including a valve opening/closing mechanism (10) which includes: a valve body (11) rotatable in a direction perpendicular to a channel (4) in a body; a sheet ring (12) which can move a valve-seat sealing part toward and away from the valve body by making reciprocating movements in a direction of the channel; a cam mechanism (13) which separates the sheet ring (12) from the valve body (11) and rotates the valve body; and a reciprocating movement mechanism (14) which causes the sheet ring (12) to make reciprocating movements in a direction of the valve body, wherein the valve opening/closing mechanism (10) is an opening/closing mechanism which controls pressure in the channel (4) by rotating the valve body (11) without sliding with the sheet ring (12).

8 Claims, 9 Drawing Sheets

(51) Int. Cl.
  *F16K 31/524*   (2006.01)
  *F16K 1/226*    (2006.01)
  *F16K 51/02*    (2006.01)
  *F16K 1/228*    (2006.01)

(58) Field of Classification Search
  USPC .................. 251/170, 192, 162, 251, 305
  See application file for complete search history.

(56)         References Cited

FOREIGN PATENT DOCUMENTS

| JP | 54-122132  | 8/1979 |
| JP | 61-64571   | 5/1986 |
| JP | 64-31265   | 2/1989 |
| JP | 1-135270   | 9/1989 |
| JP | 2010-60133 | 3/2010 |

\* cited by examiner

BUTTERFLY PRESSURE CONTROL VALVE

TECHNICAL FIELD OF THE INVENTION

The present invention relates to a butterfly pressure control valve with an insolation function, the valve capable of accurately controlling from a minute flow rate to a large flow rate while ensuring high sealability and performing rapid pressure control from atmospheric pressure to a low vacuum in, for example, a semiconductor manufacturing process.

BACKGROUND OF THE INVENTION

Conventionally, for example, between a vacuum chamber as a vacuum container and a vacuum pump in a semiconductor manufacturing process, a pressure control valve with an isolation function may be provided. An isolation valve for vacuum is used to allow exhaust from the vacuum chamber or stop exhaust to make the inside of the vacuum chamber close to a predetermined vacuum pressure. When pressure is controlled by this isolation valve for vacuum, it is required that high sealability be ensured when the valve is closed, the flow rate be accurately controlled from a minute flow rate to a large flow rate at the time of flow rate adjustment and, even when the pressure is changed from atmospheric pressure to a low vacuum, the pressure be rapidly controlled with high accuracy as inhibiting an abrupt change of the degree of valve opening to prevent a turbulent flow and flying particles.

As an isolation valve for vacuum for use in a semiconductor manufacturing process, a butterfly pressure control valve is advantageously used in view of structural simplification, superiority in footprint ability, etc. As an isolation valve for vacuum of this type, for example, a butterfly pressure control valve of Patent Literature 1 has been suggested. This pressure control valve has a valve opening/closing mechanism including: a sheet ring which can move toward and away from a valve body by making reciprocating movements in a channel direction; an air channel for supplying air in a direction in which the sheet ring is moved away from the valve body; and a spring which presses the sheet ring in a direction of the valve body. In this valve, the sheet ring is moved toward and away from the valve body by air supply from the air channel and a pressing force of the spring to rotate the valve body, thereby allowing flow rate control with high accuracy.

PRIOR ART DOCUMENT

Patent Literature

Patent Literature 1: Japanese Unexamined Patent Application Publication No. 2010-60133

SUMMARY OF THE INVENTION

Problems to be Solved by the Invention

However, in the butterfly pressure control valve of Patent Literature 1, since the sheet ring mounted on a body side operates by air drive by an electro-pneumatic proportional valve, responsiveness by this air compressibility has a limit. In an exhaust system in semiconductor manufacturing, more rapid vacuum pressure control may be desired, and it may be required to exert responsiveness more than air drive to rapidly perform an operation at the time of a minute flow rate.

In this pressure control valve, since control is performed by combination of the operation of the sheet ring by air drive and rotation of the valve body by motor drive, the structure of these air driving system and the mechanical driving system tends to make the inside of the valve complex and increase the entire size. Thus, a simpler structure that can be made compact is desired.

Due to the division into the air driving system and the mechanical driving system, an erroneous operation tends to occur at the time of an anomaly in a power source such as a halt of air supply to the air driving system or a power outage for some reason. In particular, when air supply is halted, only the sheet ring is forcibly moved in order to return to a closing position even if the valve body is not present at a closed position, thereby possibly causing an erroneous operation. At the time of an anomaly as described above, an urgent safe halt is desired.

The present invention has been developed as a result of diligent studies in view of the problems described above, and has an object of providing a butterfly pressure control valve suitable for pressure control inside a vacuum region, the butterfly pressure control valve with a simple structure and a small size capable of accurately controlling a flow rate from a minute flow rate to a large flow rate while ensuring high sealability by motive power from an identical driving source and capable of performing rapid pressure control from atmospheric pressure to a low vacuum by exerting an isolation function while ensuring safety.

Means to Solve the Problems

To achieve the object above, the invention according to claim 1 provides a butterfly pressure control valve including a valve opening/closing mechanism which includes: a valve body rotatable in a direction perpendicular to a channel in a body; a sheet ring which can move a valve-seat sealing part toward and away from the valve body by making reciprocating movements in a direction of the channel; a cam mechanism which separates the sheet ring from the valve body and rotates the valve body; and reciprocating movement mechanism which causes the sheet ring to make reciprocating movements in a direction of the valve body, wherein the valve opening/closing mechanism is an opening/closing mechanism which controls pressure in the channel by rotating the valve body without sliding with the sheet ring separated from the valve body by the cam mechanism and moving the sheet ring toward and away from the valve body by the cam mechanism and the reciprocating movement mechanism when the valve body is rotated to a valve-closed state, and the valve opening/closing mechanism is provided so as to be drivable by an identical driving source.

The invention according to claim 2 provides the butterfly pressure control valve, wherein the driving source is a motor, a cam member of the cam mechanism is mounted outside the body coaxially with an output shaft of the motor, and the cam member is provided with a cam surface for causing the reciprocating movement mechanism to operate to cause the sheet ring to make reciprocating movements and a cam groove for operating a rack-and-pinion mechanism which rotates the valve body.

The invention according to claim 3 provides the butterfly pressure control valve, wherein the reciprocating movement mechanism is a mechanism which has a connecting rod fixed to the sheet ring, a spring which presses the sheet ring in the direction of the valve body, and two quadrant levers provided on an outer circumferential side of the body and rotating by a roller abutting on the cam surface about a perpendicular to the channel and, with each of the levers rotating according to rotation of the cam member, causes the sheet ring to make reciprocating movements via the connecting rod.

The invention according to claim 4 provides the butterfly pressure control valve, wherein the rack-and-pinion mechanism is provided on a lower part of the cam mechanism, the rack-and-pinion mechanism has a slide member slidable with respect to the body, and the rack-and-pinion mechanism is a mechanism in which a pin provided on an upper surface side of the slide member engages with a cam grove, a rack provided near a center and a pinion provided on a valve stem engage with each other, rotation of the cam member causes the slide member to slide via the pin and the cam groove, and the sliding causes the valve body to rotate via the rack and the pinion.

The invention according to claim 5 provides the butterfly pressure control valve, wherein the cam surface is provided on an outer circumferential surface of the cam member, the cam groove is provided inside the cam member, and the cam surface and the cam groove are formed at positions in the cam member where the sheet ring and the valve body continuously operate and make mutual operations without interference.

Effect of the Invention

According to the invention of claim 1, the present invention particularly provides a butterfly pressure control valve suitable for pressure control in a vacuum region and capable of accurately controlling a flow rate by continuously controlling from a minute flow rate to a large flow rate while exerting high sealability by mechanical operation by the cam mechanism and the reciprocating movement mechanism by motive power from the identical driving source, capable of performing rapid pressure control from atmospheric pressure to a low vacuum by exerting an isolation function. In particular, with an improvement in responsiveness of the sheet ring at the time of a minute flow rate, flow rate control can be made with high accuracy. Since the valve opening/closing mechanism is driven by the identical driving source, the structure is simplified and the size is made compact. This is advantageous in cost and footprint. Even when a power outage or the like occurs, the sheet ring and the valve body can be safely stopped without interference, thereby avoiding an erroneous operation and occurrence of failure.

According to the invention of claim 2, since the cam member is provided outside the body, this cam member is not exposed to a channel side, thereby preventing occurrence of particles and attachment of a reaction product to control the flow rate of a highly-purified fluid. The rotation from the output shaft of the motor as a driving source rotates the cam member, and the reciprocating movement mechanism is operated via this cam member to cause the sheet ring to make reciprocating movements and cause the rack-and-pinion mechanism to operate to rotate the valve body. Thus, with the identical motor via one cam member, closing and sealing of the valve by the operation of the sheet ring and pressure control in a minute flow rate region can be performed. Also, pressure control in a large flow rate region by the rotation of the valve body can be performed.

According to the invention of claim 3, since the reciprocating movement mechanism is not exposed to the channel side, occurrence of particles and attachment of a reaction product can be prevented. When the cam member rotates in a valve opening direction, the rotation of the cam member rotates the connecting rod in a pushing direction by the lever via the roller to cause the sheet ring to be separated from the valve body. When the cam member rotates in a valve closing direction, the sheet ring is reliably returned to a predetermined position by elastic pressing force of the spring. Thus, it is possible to keep the valve-closed state while exerting high sealability.

According to the invention of claim 4, the rotation of the cam member can be transferred to the valve body as being decelerated by the rack-and-pinion mechanism. By finely controlling an intermediate degree of opening of the valve body, accurate flow rate control can be performed. Since the size can be reduced without exposing the rack-and-pinion mechanism to the inside of the channel, installation space can be reduced.

According to the invention of claim 5, the sheet ring and the valve body can be operated continuously without interference. Since motive power from the driving source is mechanically transferred via the cam member to the valve body and the sheet ring, smooth and rapid flow rate control can be performed with high accuracy from a valve-closed state to a valve-open state.

DESCRIPTIONS OF THE PREFERRED EMBODIMENTS

A preferred embodiment of a butterfly pressure control valve in the present invention is described in detail below based on the drawings. The butterfly pressure control valve of the present invention depicted in FIG. 1 and FIG. 2 is provided on, for example, a vacuum exhaust side between a vacuum chamber and a vacuum pump of a conduit not depicted in a semiconductor manufacturing process, and has a valve main body 1 and an actuator 2.

Figure 1:
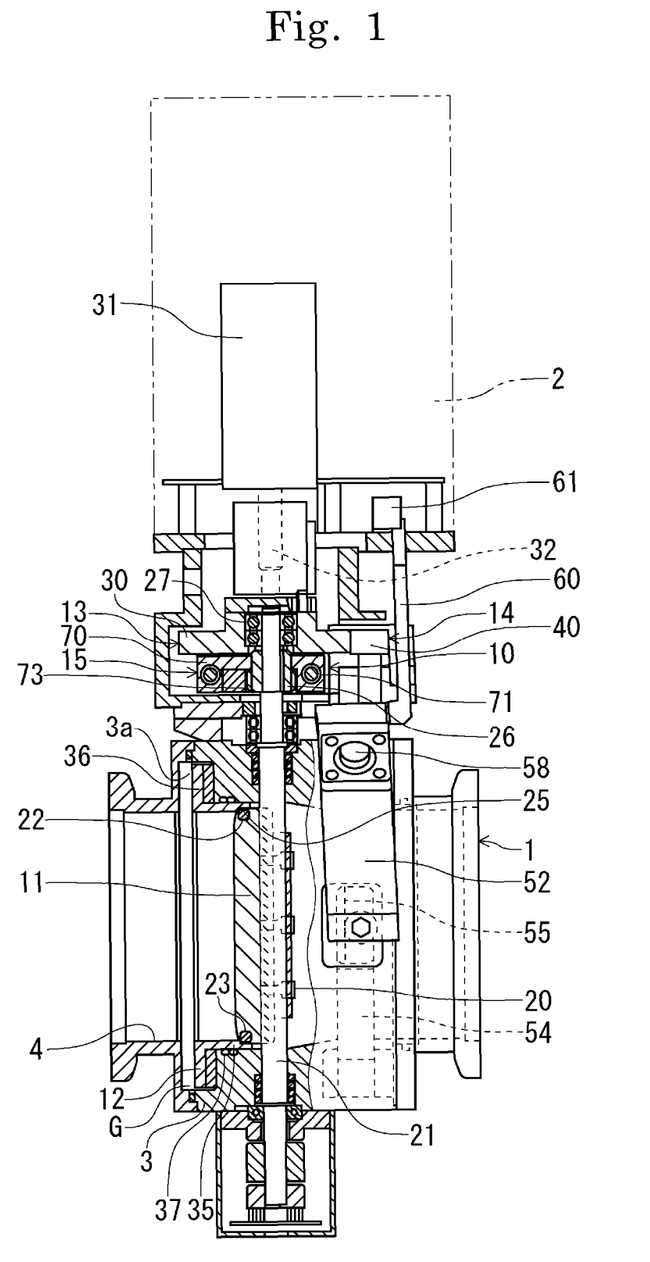
FIG. 1 is a partially-omitted sectional view depicting an embodiment of a butterfly pressure control valve in the present invention.
Figure 2:
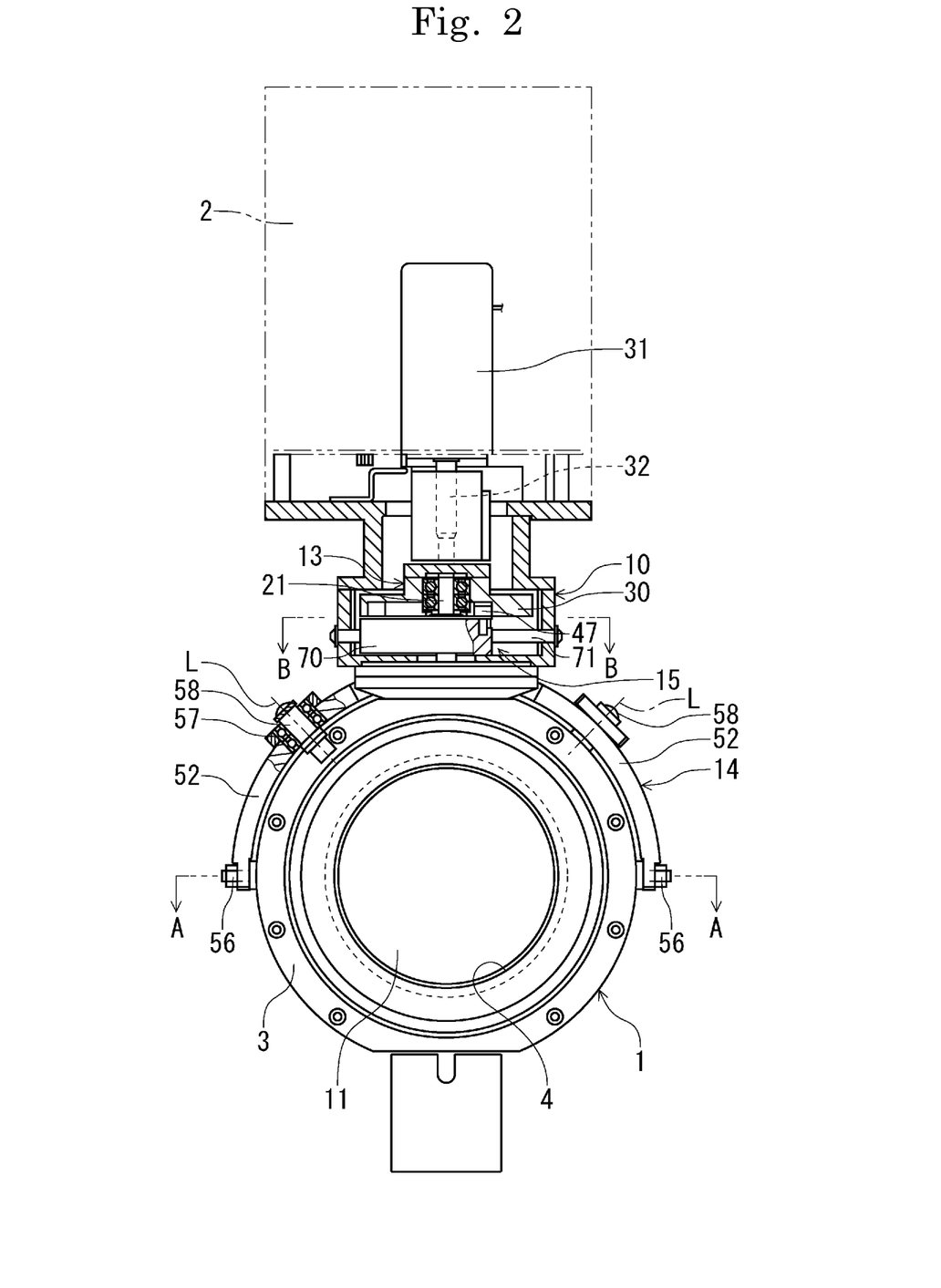
FIG. 2 is a partially-sectioned front view of FIG. 1.
Figure 3:
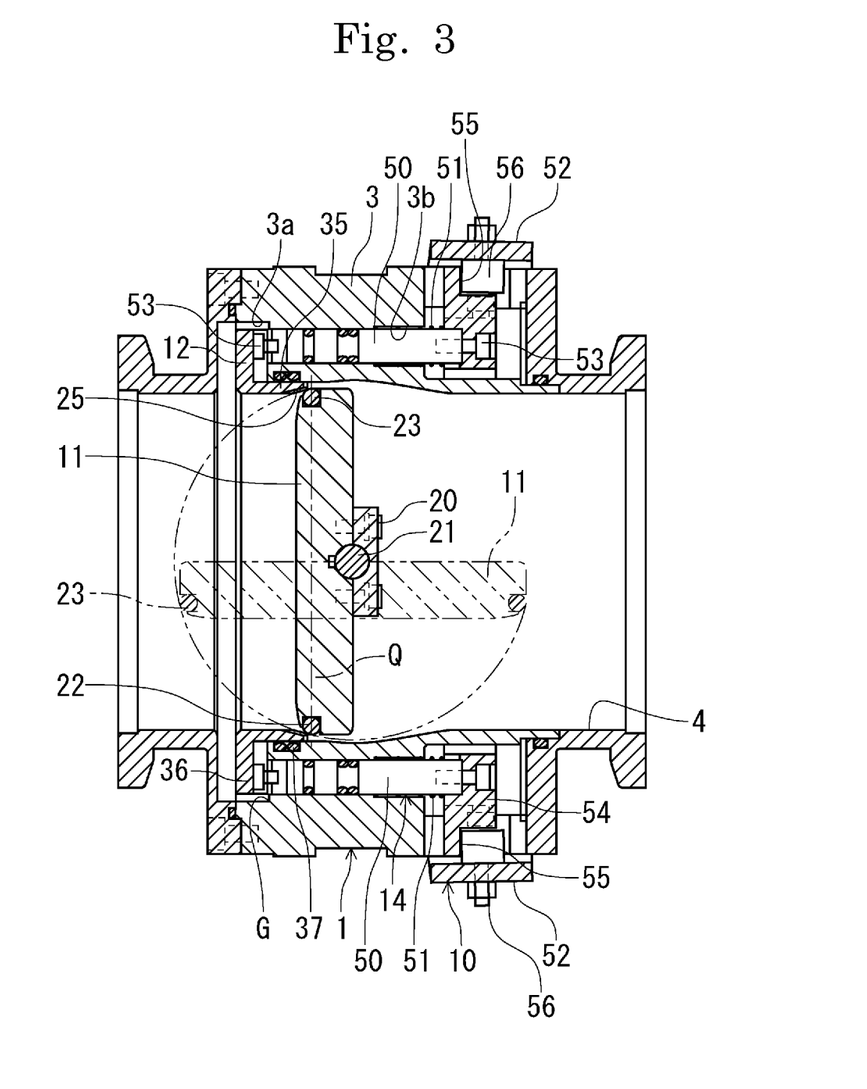
FIG. 3 is an enlarged cross sectional view along A-A in FIG. 2.

In FIG. 1 to FIG. 3, a channel 4 is formed inside a body 3 of the valve main body 1, and a valve opening/closing mechanism 10 is provided to the valve main body 1 to open and close this channel 4. A valve opening/closing mechanism 10 includes a valve body 11, a sheet ring 12, a cam mechanism 13, and reciprocating movement mechanism 14. Between the cam mechanism 13 and the valve body 11, a rack-and-pinion mechanism 15 is provided.

In the valve opening/closing mechanism 10, the valve body 11 is formed in a substantially disk shape, and is mounted on a valve stem 21 as a rotational shaft with a fixing bolt 20. With this valve stem 21, the valve body 11 can rotate in a direction perpendicular to the channel 4. On an outer perimeter side of the valve body 11, a mount groove 22 is formed. In this mount groove 22, an O ring 23 is inserted. The O ring 23 is disposed on a side abutting on a valve-seat sealing part 25, which will be described further below, of the sheet ring 12. With this O ring 23, a space between the valve-seat sealing part 25 and the valve body 11 is sealed.

As depicted in FIG. 1, a pinion 26 is mounted near an upper part of the valve stem 21, and this pinion 26 can rotate integrally with the valve stem 21. In FIG. 3, the valve stem 21 is provided so as to be decentered in a channel direction from a center Q of the valve body 11. A bearing 27 is provided on an upper end side of the valve stem 21, and the valve stem 21 is axially supported by this bearing 27 and is provided so as to be relatively rotatable together with a cam member 30, which will be described further below. In this manner, the valve stem 21 is in a state of being separated from an output shaft 32 of a motor 31 as a driving source.

In FIG. 3, the sheet ring 12 has a cylindrical part 35 having the valve-seat sealing part 25 and a flange-shaped part 36. The cylindrical part 35 is provided on the outside diameter slidable inside the channel 4 in the body 3, and the valve-seat sealing part 25 is provided on a valve body 11 side of this cylindrical part 35. The valve-seat sealing part 25 is formed on an inner circumferential surface side of the sheet ring 12 so that the O ring 23 can abut on and seal the valve-seat sealing part 25, and is formed in a tapered shape with the diameter mildly expanding from an inner diameter side to an outer diameter side. Although not depicted, this taper angle is set so that the rotating valve body 11 does not interfere, and is preferably set at, for example, on the order of 10 degrees to 15 degrees. The valve-seat sealing part 25 may be formed in a shape other than a tapered shape, and may be provided in, for example, an arc shape. The flange-shaped part 36 is provided on an opposite side of the valve-seat sealing part 25, and has an outer diameter formed so as to be movable in an expanded-diameter guiding part 3a formed in the body 3.

The sheet ring 12 is mounted inside the channel 4 while guiding the flange-shaped part 36 to the guiding part 3a, and can freely make reciprocating movements in a direction of the channel 4 with a gap G provided between the guiding part 3a and the flange-shaped part 36, thereby allowing the valve-seat sealing part 25 to move toward and away from the O ring 23 of the valve body 11. Between the sheet ring 12 and the body 3, a seal ring 37 as an O ring is provided. With this seal ring 37, fluid leakage can be prevented also at the time of sliding of the sheet ring 12.

Figure 4:
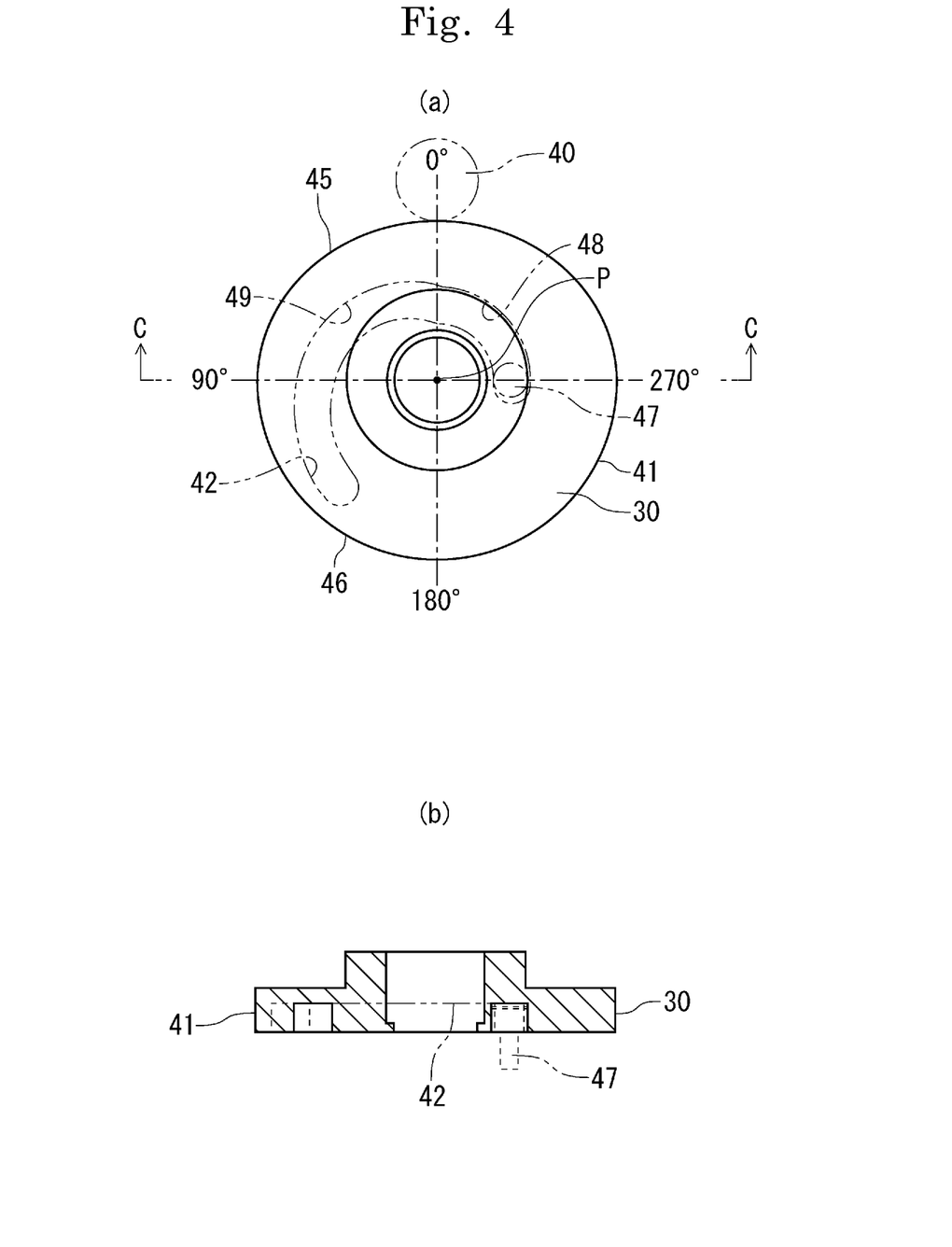
FIG. 4(a) is a plan view depicting a cam member.
FIG. 4(b) is a sectional view along C-C of FIG. 4(a).

The cam mechanism 13 in FIG. 1 and FIG. 2 has a function of moving the sheet ring 12 away from the valve body 11 and rotating this valve body 11, and includes a cam member 30 and a roller 40 as a cam follower. The cam member 30 depicted in FIG. 4 is coaxially mounted on the output shaft 32 of the motor 31 outside the body 3, and rotates with an input of rotary power from the motor 31. On an outer perimeter side of the cam member 30, a cam surface 41 is provided. Inside the cam member 30, a cam groove 42 is provided.

The cam surface 41 is provided in order to transform a rotational motion of the cam member 30 to a reciprocating motion in a channel direction of the roller 40 and to cause the sheet ring to make reciprocating movements by the operation of the reciprocating movement mechanism 14 via this roller 40. In FIG. 4, when a contact of the cam member 30 with the roller 40 before rotation (a valve fully-closed state) is assumed to be at 0 degree, an arc 45 of the cam surface 41 representing contacts with the roller 40 when the cam member 30 rotates clockwise from 0 degree to 90 degrees is formed of a distorted sine curve, and an arc 46 thereof representing those from 90 degrees to 270 degrees is formed of a curve forming a segment of a perfect circle centering at a point P.

The cam groove 42 is provided to transfer the rotational motion of the cam member 30 to a pin 47, which will be described further below, to cause the rack-and-pinion mechanism 15 to operate to rotate the valve body 11. In FIG. 4, a groove part (in FIG. 4(a), a groove in a range of 270 degrees to 0 degree) 48 of the cam groove 42 with which the pin 47 engages when the arc 45 of the cam surface 41 abuts on the roller 40 (when the cam member 30 rotates from 0 degree to 90 degrees) is formed of a curve-shaped groove with a segment of the perfect circle centering at the point P taken as a pitch circle, and a groove part (in FIG. 4(a), a groove in a range of 0 degree to 180 degrees) 49 thereof with which the pin 47 engages when the arc 46 of the cam surface 41 abuts on the roller 40 (when the cam member 30 rotates 90 degrees or more) is formed of a distorted sine curve.

As described above, the arcs 45 and 46 of the cam surface 41 and the groove parts 48 and 49 of the cam groove 42 are arranged as being shifted, the cam surface 41 and the cam groove 42 are formed at positions where the sheet ring 12 and the valve body 11 in the cam member 30 continuously operate and their mutual operations do not interfere with each other. Therefore, when a rotational motion is transformed to a linear motion via a distorted sine curve on either one side of the sheet ring 12 and the valve body 11, motion transformation is not performed on the other side with an arc forming a segment of a perfect circle.

The reciprocating movement mechanism 14 depicted in FIG. 3 has a function of pressing the sheet ring 12 toward a direction of the valve body 11, and has connecting rods 50, springs 51, and levers 52. The connecting rods 50 each have one end side fixed to the sheet ring 12 with a bolt 53 and the other end side fixed to a disk-shaped plate member 54 with the bolt 53. A linear motion of this plate member 54 in a direction of the channel 4 is transferred via the connecting rod 50 to the sheet ring 12 to cause the sheet ring 12 to make reciprocating movements, and this sheet ring 12 moves toward or away from the valve body 11. On an outer perimeter side of the plate member 54, an engaging concave part 55 is formed. An engaging pin 56 fixed to the lever 52 is engaged with this engaging concave part 55.

The springs 51 are provided in an elastic state between a concave-shaped groove 3b formed in the body 3 and the plate member 54, elastically pressing the sheet ring 12 with respect to the plate member 54 in a direction of the valve body 11. With this springs 51, the plate member 54 moves in a right direction in FIG. 3 at normal time to cause the sheet ring 12 to adhere to and seal the valve body 11 in a valve-closed state. In the present embodiment, while eight springs 51 are equidistantly mounted in a circumferential direction of the sheet ring 12, the number of springs 51 may be increased or decreased as appropriate.

Figure 6:
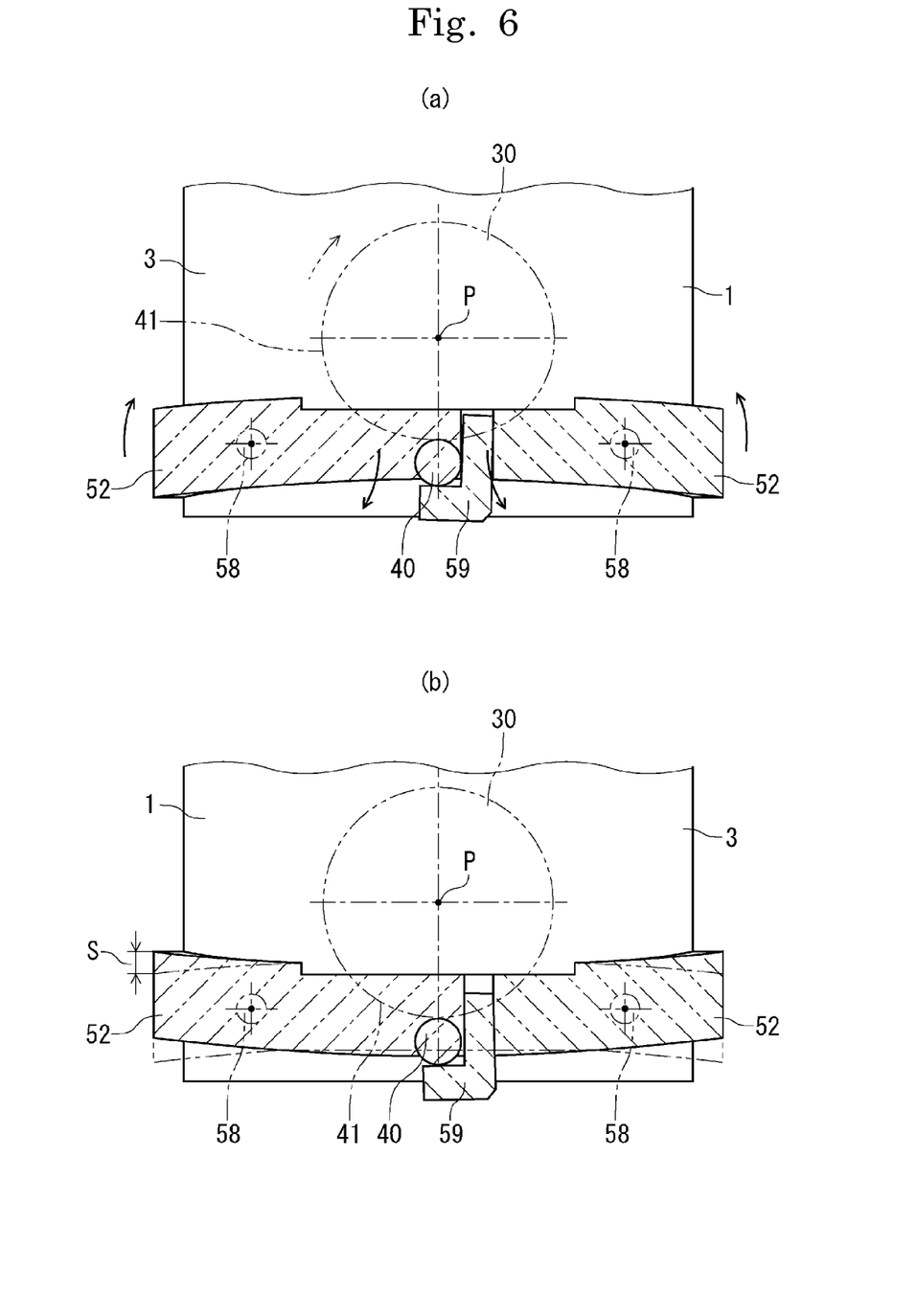
FIG. 6(a) is a partially-enlarged plan view depicting a lever state when the valve is closed.
FIG. 6(b) is a partially-enlarged plan view depicting a lever state in a state in which a sheet ring is open.

In FIG. 1 and FIG. 2, two levers 52, 52 are provided each in a quadrant manner, with a portion near the center mounted by a rotatably-supporting part 58 on an outer circumferential side of the body 3 via a bearing 57, thereby rotating about a perpendicular L to the channel 4. As depicted in FIG. 6, one lever 52 is provided with a roller 40 abutting on the cam surface 41 of the cam member 30, and the other lever 52 has an L-shaped engaging piece 59 engaging with the roller 40. When a displacement of the cam member 30 is transferred from the roller 40 to the lever 52 on one side, this lever 52 and the lever 52 in which the engaging piece 59 engages with the roller 40 each rotate about the rotatably-supporting part 58, and a tip side of each of the levers 52, 52 is moved by a stroke S in a direction of pressing the plate member 54. Note in FIG. 6 that hatching in different directions is made in order to depict two levers 52, 52.

Furthermore, a plate-shaped switch piece 60 is mounted on an upper part of either one of the levers 52, and the actuator 2 is provided with a limit switch 61 which is turned ON/OFF by this switch piece 60. When the levers 52 are rotated, the switch piece 60 turns the limit switch 61 ON. Thus, it can be confirmed that the sheet ring 12 has performed an opening operation.

In the valve opening/closing mechanism 10 described above, the valve body 11 is rotated without sliding, with the sheet ring 12 separated by the cam mechanism 13 from the valve body 11, and, when the valve body 11 is rotated to a valve-closed state, the sheet ring 12 is moved toward and away from the valve body 11 by the cam mechanism 13 and the reciprocating movement mechanism 14, thereby controlling the pressure in the channel 4. These cam mechanism 13 and the reciprocating movement mechanism 14 are provided so as to be drivable by the identical driving source, that is, the motor 31.

Figure 5:
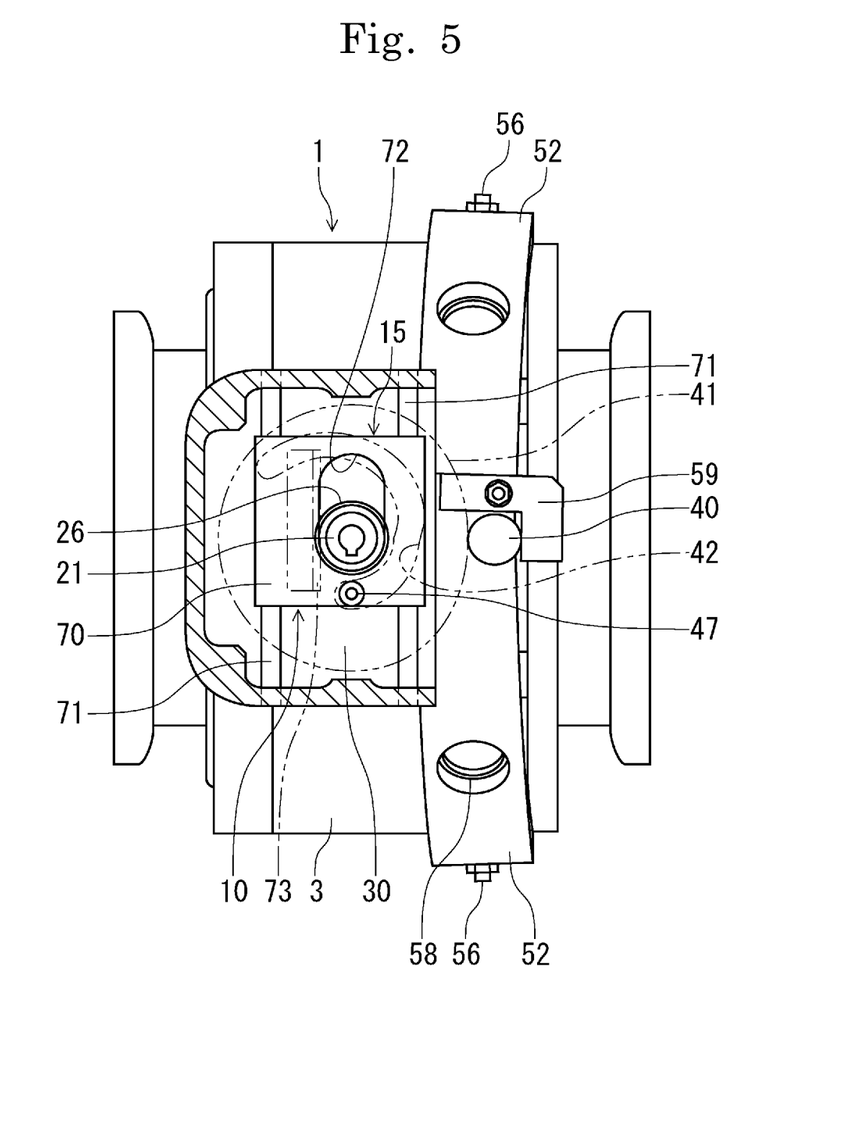
FIG. 5 is an enlarged cross sectional view along B-B in FIG. 2.

In FIG. 1, the rack-and-pinion mechanism 15 is provided on a lower part of the cam mechanism 13, and is configured of a slide member 70 and the above-described pinion 26 provided to the valve stem 21. As depicted in FIG. 5, the slide member 70 is formed in a rectangular shape, and is slidably provided to the body 3 along rail members 71 provided in parallel on an upper part of the body 3. On an upper surface side of the slide member 70, a pin 47 is integrally mounted, and this pin 47 engages with the cam groove 42. A long hole 72 is provided at a portion near the center of the slide member 70, and a rack 73 is integrally mounted so as to be along this long hole 72. The pinion 26 is intermeshed with this rack 73. With this structure, when the cam member 30 rotates, the pin 47 moves along the cam groove 42, and the slide member 70 slides via these pin 47 and cam groove 42. With this sliding, the valve stem 21 rotates via the pinion 26 intermeshed with the rack 73 to open and close the valve body 11.

The actuator 2 in FIG. 1 and FIG. 2 is incorporated in the valve body 1, thereby allowing the rotation to be transferred from the output shaft 32 of the motor 31 incorporated inside to the cam member 30. The motor 31 is preferably a stepping motor. In this case, it is possible to adjust the flow rate by rotation control with high accuracy.

In the butterfly pressure control valve described above, the sheet ring 12 having the tapered valve-seat sealing part 25 performs a reciprocating operation in a piping flow direction, thereby allowing sealing of the valve body 11 and pressure control in a minute flow rate region. The valve body 11 mounted in a direction perpendicular to the piping flow direction rotates by 90 degrees to make an opening/closing operation, thereby allowing pressure control in a large flow rate region.

Next, the operation of the butterfly pressure control valve of the present invention in the above-described embodiment is described.

Figure 7:
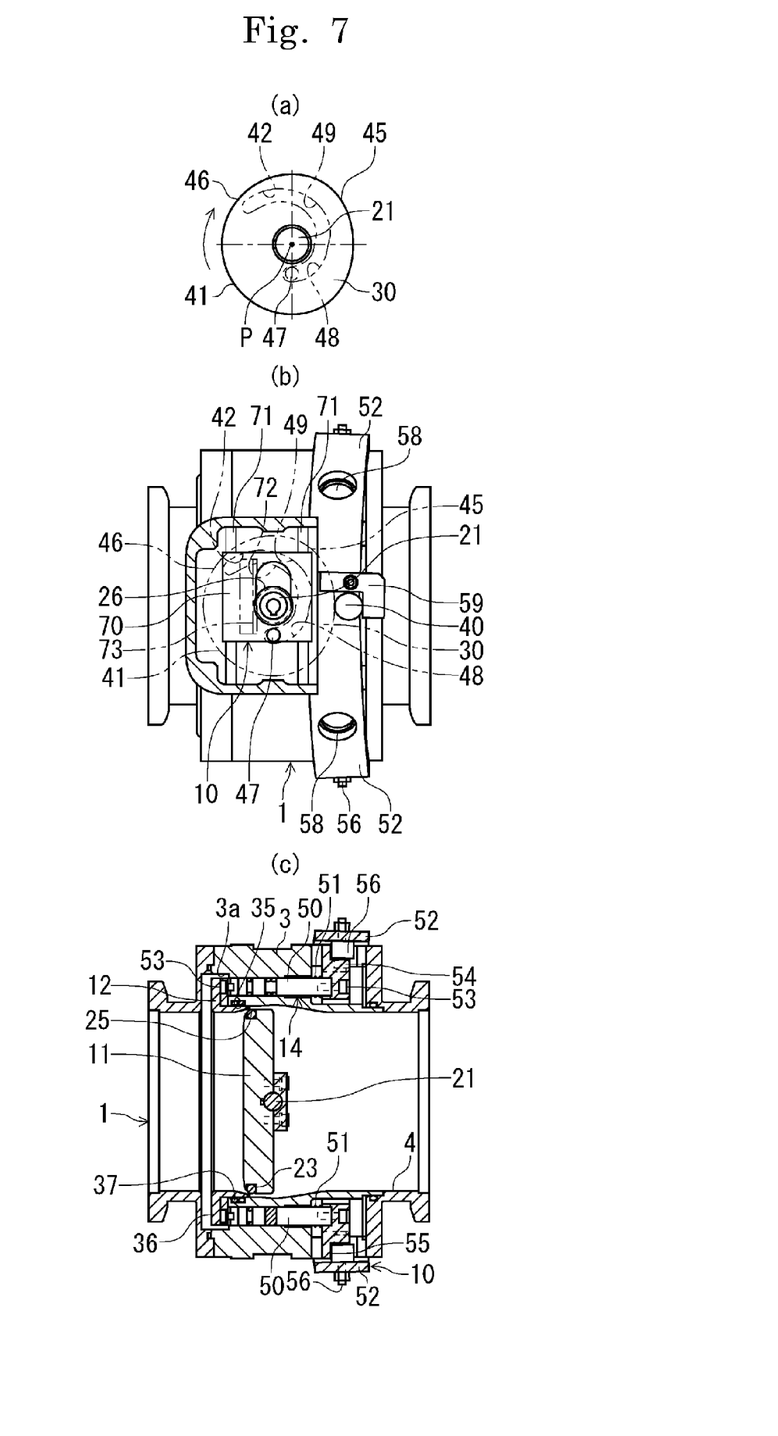
FIG. 7 is an explanatory diagram depicting a state when the valve is closed.
Figure 8:
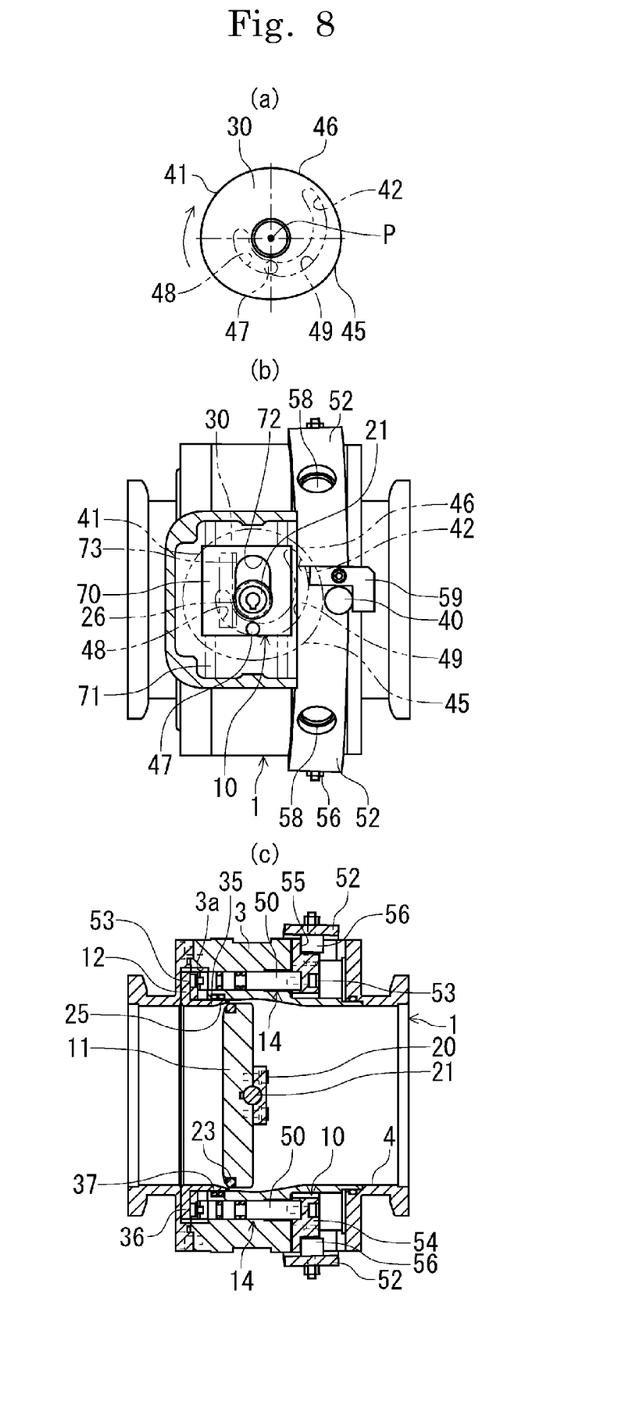
FIG. 8 is an explanatory diagram depicting a state in which the sheet ring is open.

First, when the valve is changed from a valve-closed state to a valve-open state, in the valve-closed state of the valve main body 1 of FIG. 7, the output shaft 32 of the motor 31 is rotated in a clockwise direction indicated by an arrow from a state depicted in FIG. 7(a). With this rotation of the output shaft 32, the cam member 30 integrally rotates. As depicted in FIG. 7(a) and FIG. 8(a), when the cam member 30 rotates from 0 degree to 90 degrees, the arc 45 of the cam surface 41 forms a distorted sine curve. Thus, the roller 40 abutting on the cam member 30 moves from a state depicted in FIG. 7(b) to a state depicted in FIG. 8(b) with an increase of the radius of the cam member 30, the lever 52 integrated with this roller 40 and the lever 52 engaging with the roller 40 each make a rotational motion about the rotatably-supporting part 58 and, as depicted in FIG. 6(b), the tip side of each of the levers 52, 52 moves with the stroke S. Here, since the roller 40 is pressed onto the cam member 30 by the pressing force of the springs 51, the rotation of the cam member 30 reliably activates the levers 52. With this rotation of the levers 52, the springs 51 are contracted.

When the tip side of each lever 52 moves, the engaging pin 56 mounted at this tip side presses the plate member 54 via the engaging concave part 55. From this plate member 54 via the connecting rod 50, the sheet ring 12 makes a linear motion as depicted in FIG. 8(c), and this sheet ring 12 becomes separated from the valve body 11 by the stroke S.

Here, the groove part 48 of the cam groove 42 is a curved groove with part of the perfect circle centering at the point P as a pitch circle. With this, when the cam member 30 rotates from 0 degree to 90 degrees, this rotation is not transferred to the pin 47. Thus, the slide member 70 does not slide more than the state depicted in FIG. 8.

When the cam member 30 rotates from this state by 90 degrees and more as depicted in FIG. 9(a), since the arc 46 of the cam surface 41 is formed of a curve which forms part of the perfect circle centering at the point P, the roller 40 abutting on the cam member 30 does not further move from the state depicted in FIG. 8(b), and a predetermined separated state of the sheet ring 12 is kept as depicted in FIG. 9(c).

On the other hand, on a cam groove 42 side, the groove part 49 is provided as a distorted sine curve. Thus, as depicted in FIG. 9(b), as the pin 47 moves along this groove part 49, the slide member 70 slides with a liner motion along the rail members 71, and the rack 73 mounted on the slide member 70 causes the pinion 26 to make a rotational motion in a counterclockwise direction, thereby causing the valve stem 21 to rotate in an opening direction to cause the valve body 11 to become an open state. In this case, since the length of the cam groove 42 is set so that the valve body 11 becomes in a full-open state when the pin 47 reaches an end side of the cam groove 42, the valve body 11 rotates by 90 degrees when the cam member 30 rotates at maximum to become in a full-open state, as depicted in FIG. 9(c).

Figure 9:
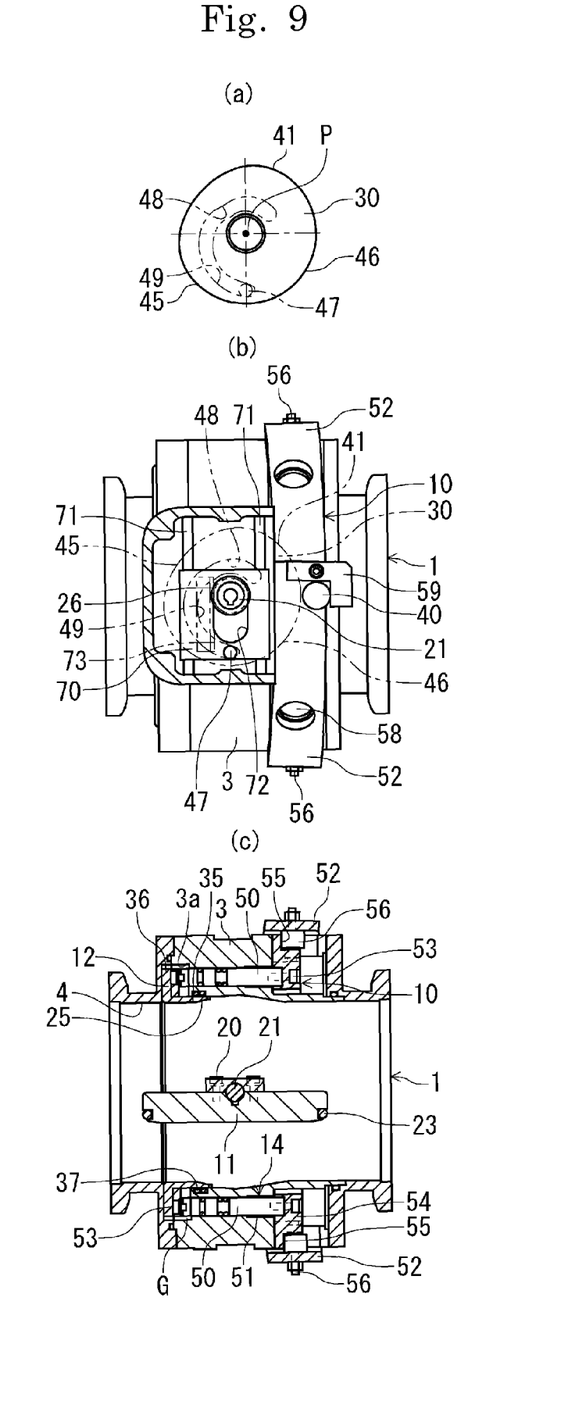
FIG. 9 is an explanatory diagram depicting a state in which the valve is open.

Next, when the valve-open state is changed to the valve-closed state, in the valve-open state of FIG. 9, the output shaft 32 of the motor 31 is rotated in a counterclockwise direction. With this rotation of the output shaft 32, the cam member 30 rotates in a counterclock direction to the state of FIG. 8(a). Then, in FIG. 8(c), the slide member 70 slides in a direction in reverse to a valve opening direction to cause the valve body 11 to rotate via the rack 73 and the pinion 26 to a closed state. Here, the sheet ring 12 is kept in a state of being separated from the valve body 11, owing to the shape of the arc 46 of the cam surface 41.

Furthermore, when the cam member 30 rotates to the state depicted in FIG. 7(a), with an elastic pressing force of the springs 51 compressed between the body 3 and the plate member 54, the roller 40 follows the decrease of the radius of the cam member 30 to cause the plate member 54 to move from the state of FIG. 8(b) to the state of FIG. 7(b) and cause the levers 52 to rotate in a reverse direction of a valve-opening operation, and the sheet ring 12 fixed to the levers 52 via the connecting rods 50 makes a linear motion to the state of FIG. 7(c) to cause the valve-seat sealing part 25 to abut on the valve body 11 to cause a valve-closed state. In this valve-closed state, the valve-seat sealing part is strongly pressed by the springs 51 to the valve body 11, thereby achieving high sealability.

As has been described above, in the butterfly pressure control valve of the present invention, the flow rate is controlled by controlling the position of the sheet ring 12 via the cam mechanism 13, the reciprocating movement mechanism 14, and the rack-and-pinion mechanism 15 of the valve opening/closing mechanism 10 and also controlling the rotation of the valve body 11. Thus, responsiveness is enhanced in the entire region at the time of opening and closing the valve. In particular, a minute flow rate can be controlled with the sheet ring 12 caused by the cam mechanism 13 to make reciprocating movements, thereby allowing pressure control with high accuracy.

Since the valve opening/closing mechanism 10 is driven by the motor 31 as an identical driving source, the inner structure of the valve main body 1 and the actuator 2 can be simplified, and the entire valve can be made compact.

During the operation of the actuator main body 2, when rotary power from the motor 31 is stopped due to a power outage or the like, the rotation of the cam member 30 is also stopped. Via this cam member 30, the sheet ring 12 and the valve body 11 each stop in a midcourse position. Therefore, the sheet ring 12 and the valve body 11 do not contact with each other and can smoothly restart the operation from the midcourse of the operation when the rotation of the motor 31 is restarted.

Furthermore, the cam mechanism 13, the reciprocating movement mechanism 14, and the rack-and-pinion mechanism 15 are provided so as not to be exposed inside the channel 4. Therefore, even when the present invention is used for a semiconductor manufacturing apparatus, a trouble in actuation due to attachment of a reaction product or the like is less prone to occur, facilitating an overhaul and maintenance.

DESCRIPTION OF REFERENCE NUMERALS 1 valve main body
3 body
4 channel
10 valve opening/closing mechanism
11 valve body
12 sheet ring
13 cam mechanism
14 reciprocating movement mechanism
15 rack-and-pinion mechanism
21 valve stem
25 valve-seat sealing part
26 pinion
30 cam member
31 motor (driving source)
40 roller
41 cam surface
42 cam groove
47 pin
50 connecting rod
51 spring
52 lever
70 slide member
73 rack
L perpendicular

What is claimed is:

1. A butterfly pressure control valve comprising a valve opening/closing mechanism which includes:
   a valve body rotatable in a direction perpendicular to a channel in a body;
   a sheet ring which can move a valve-seat sealing part toward and away from the valve body by making reciprocating movements in a direction of the channel;
   a cam mechanism which separates the sheet ring from the valve body and rotates the valve body; and
   a reciprocating movement mechanism which causes the sheet ring to make reciprocating movements in a direction of the valve body,
   wherein the valve opening/closing mechanism is an opening/closing mechanism which controls pressure in the channel by rotating the valve body without sliding with the sheet ring separated from the valve body by the cam mechanism and moving the sheet ring toward and away from the valve body by the cam mechanism and the reciprocating movement mechanism when the valve body is rotated to a valve-closed state,
   wherein the valve opening/closing mechanism is provided so as to be drivable by an identical driving source,
   wherein the driving source is a motor, a cam member of the cam mechanism is mounted outside the body coaxially with an output shaft of the motor, and the cam member is provided with a cam surface for causing the reciprocating movement mechanism to operate to cause the sheet ring to make reciprocating movements and a cam groove for operating a rack-and-pinion mechanism which rotates the valve body.

2. The butterfly pressure control valve according to claim 1, wherein the rack-and-pinion mechanism is provided on a lower part of the cam mechanism, the rack-and-pinion mechanism has a slide member slidable with respect to the body, and the rack-and-pinion mechanism is a mechanism in which a pin provided on an upper surface side of the slide member engages with the cam groove, a rack provided near a center and a pinion provided on a valve stem engage with each other, rotation of the cam member causes the slide member to slide via the pin and the cam groove, and the sliding causes the valve body to rotate via the rack and the pinion.

3. The butterfly pressure control valve according to claim 2, wherein the cam surface is provided on an outer circumferential surface of the cam member, the cam groove is provided inside the cam member, and the cam surface and the cam groove are formed at positions in the cam member where the sheet ring and the valve body continuously operate and make mutual operations without interference.

4. The butterfly pressure control valve according to claim 1, wherein the cam surface is provided on an outer circumferential surface of the cam member, the cam groove is provided inside the cam member, and the cam surface and the cam groove are formed at positions in the cam member where the sheet ring and the valve body continuously operate and make mutual operations without interference.

5. The butterfly pressure control valve according to claim 1, wherein the reciprocating movement mechanism is a mechanism which has a connecting rod fixed to the sheet ring, a spring which presses the sheet ring in the direction of the valve body, and two quadrant levers provided on an outer circumferential side of the body and rotating by a roller abutting on the cam surface about a perpendicular to the channel and, with each of the levers rotating according to rotation of the cam member, causes the sheet ring to make reciprocating movements via the connecting rod.

6. A butterfly pressure control valve comprising a valve opening/closing mechanism which includes:
- a valve body rotatable in a direction perpendicular to a channel in a body;
- a sheet ring which can move a valve-seat sealing part toward and away from the valve body by making reciprocating movements in a direction of the channel;
- a cam mechanism which separates the sheet ring from the valve body and rotates the valve body; and
- a reciprocating movement mechanism which causes the sheet ring to make reciprocating movements in a direction of the valve body,
- wherein the valve opening/closing mechanism is an opening/closing mechanism which controls pressure in the channel by rotating the valve body without sliding with the sheet ring separated from the valve body by the cam mechanism and moving the sheet ring toward and away from the valve body by the cam mechanism and the reciprocating movement mechanism when the valve body is rotated to a valve-closed state,
- wherein the valve opening/closing mechanism is provided so as to be drivable by an identical driving source,
- wherein the reciprocating movement mechanism is a mechanism which has a connecting rod fixed to the sheet ring, a spring which presses the sheet ring in the direction of the valve body, and two quadrant levers provided on an outer circumferential side of the body and rotating by a roller abutting on the cam surface about a perpendicular to the channel and, with each of the levers rotating according to rotation of the cam member, causes the sheet ring to make reciprocating movements via the connecting rod.

7. The butterfly pressure control valve according to claim 6, wherein the rack-and-pinion mechanism is provided on a lower part of the cam mechanism, the rack-and-pinion mechanism has a slide member slidable with respect to the body, and the rack-and-pinion mechanism is a mechanism in which a pin provided on an upper surface side of the slide member engages with a cam groove, a rack provided near a center and a pinion provided on a valve stem engage with each other, rotation of the cam member causes the slide member to slide via the pin and the cam groove, and the sliding causes the valve body to rotate via the rack and the pinion.

8. The butterfly pressure control valve according to claim 6, wherein the cam surface is provided on an outer circumferential surface of the cam member, the cam groove is provided inside the cam member, and the cam surface and the cam groove are formed at positions in the cam member where the sheet ring and the valve body continuously operate and make mutual operations without interference.

* * * * *